(12) United States Patent
Chen et al.

(10) Patent No.: US 12,451,786 B2
(45) Date of Patent: Oct. 21, 2025

(54) LINEAR VIBRATION MOTOR

(71) Applicant: AAC Microtech (Changzhou) Co., Ltd., Jiangsu (CN)

(72) Inventors: Weibo Chen, Changzhou (CN); Xiaorong Zhou, Changzhou (CN); Ziyang Zhang, Changzhou (CN); Keyang Wang, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 195 days.

(21) Appl. No.: 18/539,283

(22) Filed: Dec. 14, 2023

(65) Prior Publication Data

US 2025/0079962 A1    Mar. 6, 2025

Related U.S. Application Data

(63) Continuation of application No. PCT/CN2023/116814, filed on Sep. 4, 2023.

(51) Int. Cl.
*H02K 33/18*    (2006.01)

(52) U.S. Cl.
CPC ................... *H02K 33/18* (2013.01)

(58) Field of Classification Search
CPC ........ H02K 35/00; H02K 35/02; H02K 35/04; H02K 35/06; H02K 33/18; H02K 33/00; H02K 33/02; H02K 33/16
USPC .......... 310/25, 15, 12.01, 81, 20, 21, 28–30, 310/36–37, 40 MM
See application file for complete search history.

(56) References Cited

U.S. PATENT DOCUMENTS

| | | | | |
|---|---|---|---|---|
| 6,057,554 A * | 5/2000 | Plesko | ................. | H03K 17/955 250/221 |
| 6,218,767 B1 * | 4/2001 | Akada | .................. | H02N 2/0085 310/323.02 |
| 6,413,117 B1 * | 7/2002 | Annerino | ........... | H01R 12/7076 439/500 |
| 8,358,039 B2 * | 1/2013 | Trumper | ................ | G01Q 10/04 310/12.24 |
| 8,624,450 B2 * | 1/2014 | Dong | ..................... | H02K 33/16 310/20 |
| 8,648,502 B2 * | 2/2014 | Park | ....................... | H02K 33/16 310/15 |
| 9,225,265 B2 * | 12/2015 | Oh | ........................... | G06F 3/016 |
| 9,543,816 B2 * | 1/2017 | Nakamura | ............ | H02K 33/16 |

(Continued)

*Primary Examiner* — Maged M Almawri
(74) *Attorney, Agent, or Firm* — Wiersch Law Group

(57) ABSTRACT

The present application provides a linear vibration motor, including a casing, a stator and a vibrator accommodated in the casing, and an elastic member for suspending the vibrator in the casing. The vibrator includes a mass block having a through-hole, and a magnetic circuit system. The magnetic circuit system includes a first magnetic steel arranged on one side of the stator and a second magnetic steel arranged on the other side of the stator. The first magnetic steel and the second magnetic steel are extended in parallel and arranged centrally symmetrically around a geometric center of the stator. The first magnetic steel includes a first magnetic steel portion, and the second magnetic steel includes a second magnetic steel portion. The asymmetric magnetic circuit structure can improve the nonlinear vibration when the stator is offset during the arrangement, which is helpful for improving the stability and yield of the test.

9 Claims, 3 Drawing Sheets

(56) References Cited

U.S. PATENT DOCUMENTS

| | | | |
|---|---|---|---|
| 9,948,170 B2* | 4/2018 | Jun | H02K 33/00 |
| 10,160,010 B2* | 12/2018 | Chun | H02K 33/16 |
| 10,250,989 B1* | 4/2019 | Xiao | H04R 23/008 |
| 10,284,959 B2* | 5/2019 | Xiao | H04R 7/12 |
| 10,483,451 B2* | 11/2019 | Wang | H10N 30/01 |
| 10,491,090 B2* | 11/2019 | Zu | H02K 33/16 |
| 10,596,596 B2* | 3/2020 | Ling | H04R 9/066 |
| 10,674,278 B2* | 6/2020 | Zhou | H04R 9/025 |
| 10,763,732 B2* | 9/2020 | Liu | H02K 33/18 |
| 10,886,827 B2* | 1/2021 | Liu | H02K 33/14 |
| 10,978,941 B2* | 4/2021 | Tang | H02K 33/12 |
| 11,025,148 B2* | 6/2021 | Tang | H02K 33/12 |
| 11,638,097 B1* | 4/2023 | Jin | H04R 7/20 381/412 |
| 2006/0066164 A1* | 3/2006 | Kim | H02K 7/063 310/81 |
| 2009/0096299 A1* | 4/2009 | Ota | B06B 1/045 310/25 |
| 2010/0213773 A1* | 8/2010 | Dong | H02K 33/16 310/25 |
| 2010/0302752 A1* | 12/2010 | An | H02K 33/06 361/807 |
| 2011/0057629 A1* | 3/2011 | Lin | H02K 35/02 322/3 |
| 2011/0089772 A1* | 4/2011 | Dong | H02K 33/16 310/25 |
| 2011/0115311 A1* | 5/2011 | Dong | H02K 33/16 310/28 |
| 2011/0133577 A1* | 6/2011 | Lee | H02K 33/18 310/15 |
| 2011/0241451 A1* | 10/2011 | Park | H02K 33/16 310/25 |
| 2012/0032535 A1* | 2/2012 | Park | H02K 35/02 310/25 |
| 2012/0108299 A1* | 5/2012 | Yang | H02K 33/16 455/567 |
| 2012/0187780 A1* | 7/2012 | Bang | H02K 33/16 310/25 |
| 2012/0313459 A1* | 12/2012 | Zhang | H02K 33/18 310/25 |
| 2012/0319506 A1* | 12/2012 | Shim | H02K 33/16 310/25 |
| 2013/0093266 A1* | 4/2013 | Hong | H02K 33/18 29/446 |
| 2013/0099600 A1* | 4/2013 | Park | B06B 1/045 310/15 |
| 2013/0119785 A1* | 5/2013 | Han | G02B 27/646 310/12.16 |
| 2013/0119787 A1* | 5/2013 | Yu | H02K 33/16 310/25 |
| 2013/0169072 A1* | 7/2013 | Oh | H02K 33/16 310/36 |
| 2014/0054983 A1* | 2/2014 | Moon | H02K 33/16 310/28 |
| 2014/0062225 A1* | 3/2014 | Kim | H02K 33/00 310/15 |
| 2014/0346901 A1* | 11/2014 | Hayward | H02K 15/14 310/25 |
| 2015/0123498 A1* | 5/2015 | Yang | H02K 33/16 310/25 |
| 2015/0194870 A1* | 7/2015 | Kim | H02K 33/18 310/25 |
| 2016/0164389 A1* | 6/2016 | Jang | H02K 7/116 310/20 |
| 2016/0173990 A1* | 6/2016 | Park | H04R 9/043 381/354 |
| 2016/0254736 A1* | 9/2016 | Jin | H02K 33/16 310/25 |
| 2017/0033653 A1* | 2/2017 | Wang | H02K 33/16 |
| 2017/0033657 A1* | 2/2017 | Mao | H02K 33/16 |
| 2017/0076888 A1* | 3/2017 | Ruff | H02K 35/00 |
| 2017/0104401 A1* | 4/2017 | Umehara | H02K 33/16 |
| 2017/0250596 A1* | 8/2017 | Son | H02K 7/08 |
| 2018/0021812 A1* | 1/2018 | Akanuma | H02K 33/00 310/25 |
| 2018/0115230 A1* | 4/2018 | Mao | H02K 11/215 |
| 2018/0241295 A1* | 8/2018 | Zu | H02K 33/14 |
| 2018/0278137 A1* | 9/2018 | Zhu | H02K 33/18 |
| 2018/0297061 A1* | 10/2018 | Mao | H02K 5/04 |
| 2018/0358878 A1* | 12/2018 | Liu | H02K 1/34 |
| 2018/0367919 A1* | 12/2018 | Xiao | H04R 31/006 |
| 2019/0044425 A1* | 2/2019 | Zu | H02K 33/02 |
| 2019/0151895 A1* | 5/2019 | Takahashi | B06B 1/045 |
| 2019/0246211 A1* | 8/2019 | Xiao | H04R 7/02 |
| 2020/0044535 A1* | 2/2020 | Tang | H02K 33/16 |
| 2020/0044548 A1* | 2/2020 | Tang | H02K 33/18 |
| 2020/0052567 A1* | 2/2020 | Yamada | H01F 7/066 |
| 2020/0195115 A1* | 6/2020 | Zhang | H02K 33/16 |
| 2020/0212745 A1* | 7/2020 | Ling | B06B 1/045 |
| 2020/0412221 A1* | 12/2020 | Yan | H02K 33/16 |
| 2020/0412228 A1* | 12/2020 | Mao | H02K 33/18 |
| 2022/0278599 A1* | 9/2022 | Cui | H02K 33/16 |
| 2022/0311319 A1* | 9/2022 | Cui | H02K 33/16 |
| 2022/0320984 A1* | 10/2022 | Li | H02K 33/02 |
| 2023/0318424 A1* | 10/2023 | Ma | H02K 33/16 310/28 |
| 2024/0186876 A1* | 6/2024 | Zhu | H02K 33/02 |
| 2024/0339906 A1* | 10/2024 | Zhu | H02K 33/18 |

* cited by examiner

LINEAR VIBRATION MOTOR

CROSS-REFERENCE TO RELATED APPLICATIONS

This application is a continuation of International Application No. PCT/CN2023/116814, filed Sep. 4, 2023, the entire contents of which are incorporated herein by reference.

TECHNICAL FIELD

The present application relates to the technical field of linear vibration motors, in particular to a magnetic circuit structure of a linear vibration motor.

BACKGROUND

A linear motor is a transmission device that directly converts electrical energy into linear mechanical motion, which is also known as a linear actuator, or push rod motor. The linear motor typically includes a vibrator and a stator, and achieves reciprocating motion of the mover under the action of Ampere force without the need for transmission mechanisms such as gears. Due to its simple structure, high acceleration, and precision advantages, linear motors are widely adopted in various manufacturing and processing technologies.

The magnetic circuit in the linear vibration motor in the prior art is designed with a symmetrical structure. However, during the fixing of the stator, there is a tendency for the arrangement position to deviate, leading to non-linear vibrations in the vibration motor.

Therefore, it is necessary to provide a new linear vibration motor to solve the above technical problems.

SUMMARY

An object of the present application is to provide a linear vibration motor with better stability and yield.

The technical solution of the present application is as follows. The present application provides a linear vibration motor, comprising:
  a casing with an accommodating space;
  a stator accommodated in the accommodating space;
  a vibrator accommodated in the accommodating space, comprising:
    a mass block fixedly connected to an elastic member and provided with a through-hole; and
    a magnetic circuit system accommodated in the through-hole, comprising:
      a first magnetic steel arranged on one side of the stator in a vibration direction perpendicular to the vibrator; and
      a second magnetic steel arranged on the other side of the stator in the vibration direction perpendicular to the vibrator; and
  the elastic member fixed to the casing and configured to suspend in the vibrator in the accommodating space;
  wherein the first magnetic steel and the second magnetic steel are extended in parallel and arranged centrally symmetrically around a geometric center of the stator; the first magnetic steel comprises a first magnetic steel portion, an orthographic projection of which along a direction perpendicular to the vibration direction of the vibrator is arranged outside the second magnetic steel; and the second magnetic steel comprises a second magnetic steel portion, an orthographic projection of which along the direction perpendicular to the vibration direction of the vibrator is arranged outside the first magnetic steel.

In one embodiment, a length of the first magnetic steel portion is equal to a length of the second magnetic steel portion.

In one embodiment, a ratio of the length of the first magnetic steel section to a length of the first magnetic steel does not exceed 1/10, and a ratio of the length of the second magnetic steel section to a length of the second magnetic steel does not exceed 1/10.

In one embodiment, the ratio of the length of the first magnetic steel section to the length of the first magnetic steel ranges between 1/25 and 1/20, and the ratio of the length of the second magnetic steel section to the length of the second magnetic steel ranges between 1/25 and 1/20.

In one embodiment, the magnetic circuit system comprises a third magnetic steel arranged on one side of the stator in the vibration direction of the vibrator and a fourth magnetic steel arranged on the other side of the stator in the vibration direction of the vibrator; wherein the third magnetic steel and the fourth magnetic steel are arranged centrally symmetrically around the geometrical center of the stator.

In one embodiment, a distance between the first magnetic steel and the stator is equal to a distance between the second magnetic steel and the stator, and a distance between the third magnetic steel and the stator is equal to a distance between the fourth magnetic steel and the stator.

In one embodiment, the magnetic circuit system comprises a first magnetic conducting sheet sandwiched between the first magnetic steel and the mass block, a second magnetic conducting sheet sandwiched between the second magnetic steel and the mass block, a third magnetic conducting sheet sandwiched between the third magnetic steel and the mass block, and a fourth magnetic conducting sheet sandwiched between the fourth magnetic steel and the mass block.

In one embodiment, the first magnetic conducting sheet is aligned with and of equal length to the first magnetic steel; the second magnetic conducting sheet is aligned with and of equal length to the second magnetic steel; the third magnetic conducting sheet is aligned with and of equal length to the third magnetic steel; and the fourth magnetic conducting sheet is aligned with and of equal length to the fourth magnetic steel.

In one embodiment, the elastic member comprises an elastic arm spaced apart from the mass block, a first connecting arm bent and extended from one end of the elastic arm to be fixed to the mass block, and a second connecting arm bent and extended from the other end of the elastic arm to be fixed to the casing; and the linear vibration motor further comprises a foam sandwiched between the elastic arm and the mass block.

The beneficial effect of the present application is as follows. The present application provides a linear vibration motor with an asymmetric magnetic circuit structure. Compared with the related art, this asymmetric magnetic circuit structure design can improve the situation of non-linear vibrations in the vibration motor when the stator is offset during the arrangement, thereby improving the stability and yield of the test.

BRIEF DESCRIPTION OF THE DRAWINGS

In order to illustrate the technical solutions in the embodiments of the present application more clearly, the accompanying drawings to be used in the description of the embodiments will be briefly introduced below. Obviously, the accompanying drawings in the following description are only some embodiments of the present application, and for those of ordinary skill in the field, other accompanying drawings may be obtained based on these drawings without creative labor.

DETAILED DESCRIPTION OF THE EMBODIMENTS

The technical solutions in the embodiments of the present application will be described clearly and completely in the following in conjunction with the accompanying drawings in the embodiments of the present application. Obviously, the described embodiments are only a part of the embodiments of the present application and not all of the embodiments. Based on the embodiments in the present application, all other embodiments obtained by those of ordinary skill in the art without making creative labor are within the protection scope of the present application.

Figure 1:
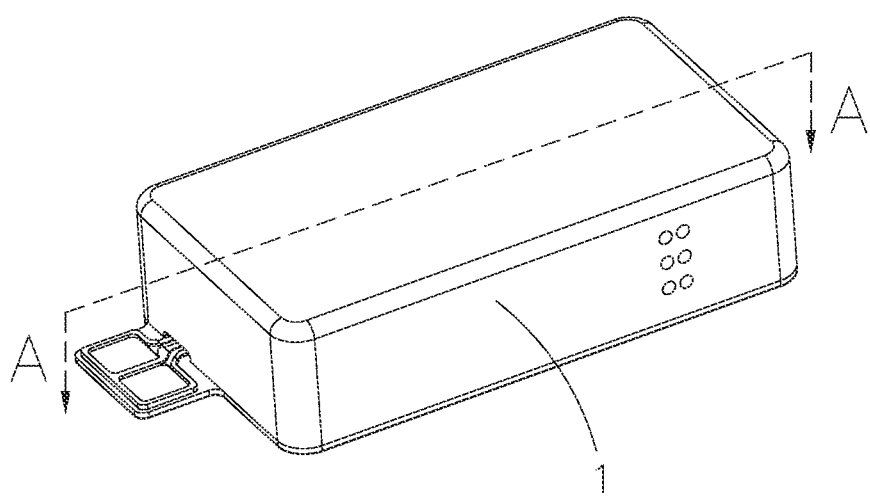
FIG. 1 shows a three-dimensional structural diagram of a linear vibration motor according to an embodiment of the present application.
Figure 2:
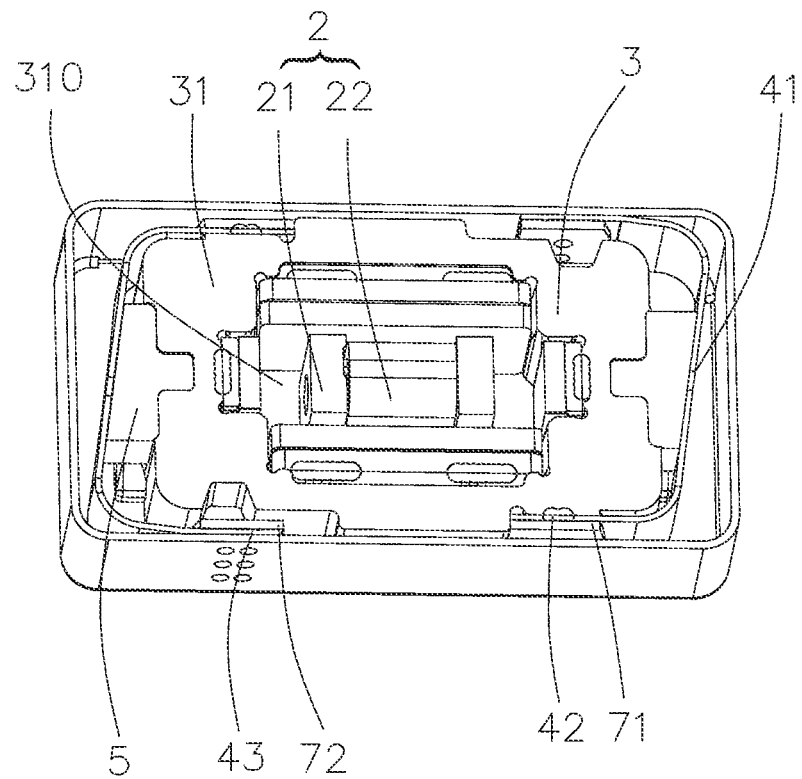
FIG. 2 shows a three-dimensional structural diagram of the linear vibration motor shown in FIG. 1 with a lower cover body removed.
Figure 3:
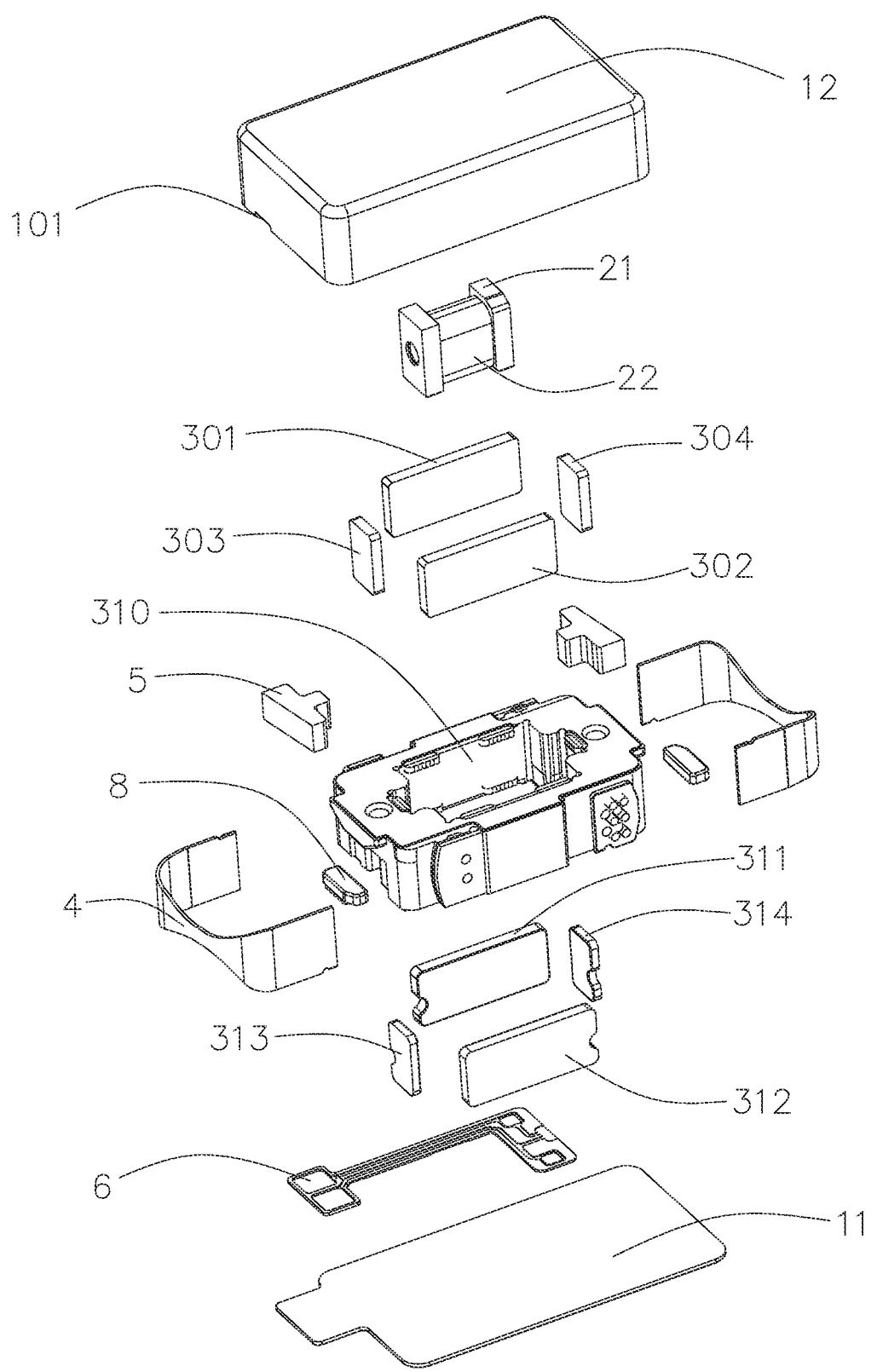
FIG. 3 shows an exploded view of the linear vibration motor shown in FIG. 1.
Figure 4:
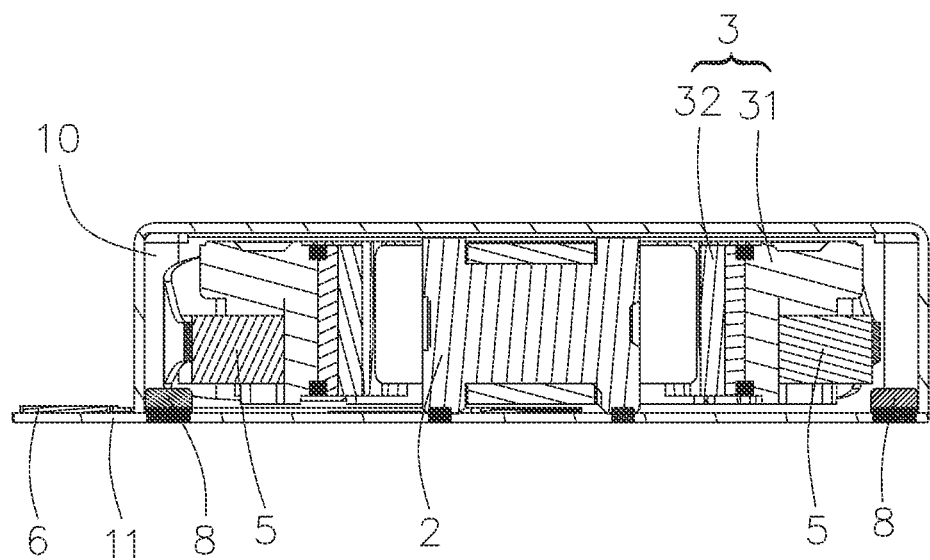
FIG. 4 shows a sectional diagram of the linear vibration motor shown in FIG. 1 along the line A-A.
Figure 5:
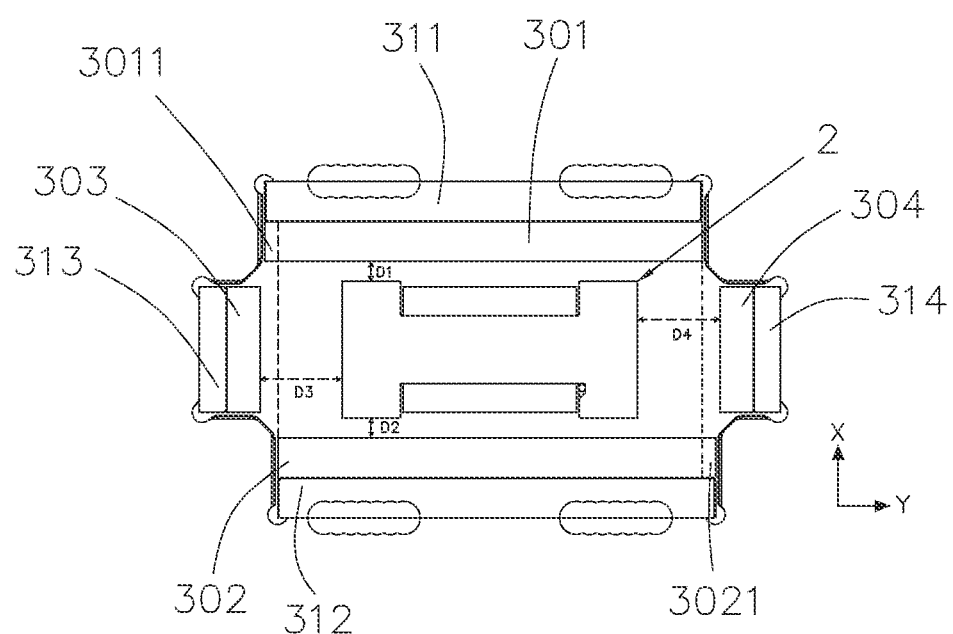
FIG. 5 shows a structural diagram of a magnetic circuit system and a stator in the linear vibration motor shown in FIG. 1.

As shown in FIGS. 1-5, the present application provides a linear vibration motor 100, including a casing 1, a stator 2 arranged in the casing 1, a vibrator 3 arranged in the casing 1, an elastic member 4 configured to suspend the vibrator 3 in the casing 1, a foam 5 provided between the elastic member 4 and the vibrator 3, and a circuit board 6 partially fixed to the casing 1. The circuit board 6 is fixed to the casing 1 and electrically connected to the stator 2. The vibration direction of the vibrator 3 is defined as the Y-axis direction, and a direction perpendicular to the vibration direction of the vibrator 3 is defined as the X-axis direction. The linear vibration motor 100 in this embodiment is rectangular, in which the long axis direction is the Y-axis direction, and the short axis direction is the X-axis direction.

The casing 1 includes a lower cover 11 and an upper cover 12 covered on the lower cover 11. The stator 2 is fixed to one side of the lower cover 11 close to the upper cover 12. The lower cover 11 and the upper cover 12 are fixedly enclosed to form an accommodating space 10 for accommodating the stator 2, the vibrator 3, and the elastic member 4. The casing 1 further includes a recess 101 for the other end of the circuit board 6 to extend to the outside.

The stator 2 includes a core 21 and a coil 22 wound around the core 21.

The vibrator 3 includes a mass block 31 having a through-hole 310 and a magnetic circuit system 32 accommodated in the through-hole 310. The magnetic circuit system 32 includes a first magnetic steel 301 arranged on one side of the stator 2 in the X-axis direction, a second magnetic steel 302 arranged on the other side of the stator 2 in the X-axis direction, a third magnetic steel 303 arranged on one side of the stator 2 in the Y-axis direction, and a fourth magnetic steel 304 arranged on the other side of the stator 2 in the Y-axis direction. The first magnetic steel 301 and the second magnetic steel 302 are extended in parallel in the Y-axis direction and arranged centrally symmetrically around a geometric center of the stator 2. The third magnetic steel 303 and the fourth magnetic steel 304 are extended in parallel in the X-axis direction and arranged centrally symmetrically around the geometric center of the stator 2.

The distance between the first magnetic steel 301 and the stator 2 is D1. The distance between the first magnetic steel 302 and the stator 2 is D2. The distance between the third magnetic steel 303 and the stator 2 is D3, and the distance between the fourth magnetic steel 304 and the stator 2 is D4. The distances satisfy the following equations: D1=D2, D3=D4, D1<D3.

The first magnetic steel 301 includes a first magnetic steel portion 3011, an orthographic projection of which along the X-axis direction is arranged outside the second magnetic steel 302. The second magnetic steel 302 includes a second magnetic steel portion 3021, an orthographic projection of which along the X-axis direction is arranged outside the first magnetic steel 301. The ratio of the length of the first magnetic steel portion 3011 to the length of the first magnetic steel 301 does not exceed 1/10, and the ratio of the length of the second magnetic steel section 3021 to the length of the second magnetic steel 301 does not exceed 1/10. In this embodiment, the length of the first magnetic steel portion 3011 is 4.5% of the total length of the first magnetic steel 301, and the length of the second magnetic steel portion 3021 is 4.5% of the total length of the second magnetic steel 302.

The magnetic circuit system 32 further includes a first magnetic conducting sheet 311 sandwiched between the first magnetic steel 301 and the mass block 31, a second magnetic conducting sheet 312 sandwiched between the second magnetic steel 302 and the mass block 31, a third magnetic conducting sheet 313 sandwiched between the third magnetic steel 303 and the mass block 31, and a fourth magnetic conducting sheet 314 sandwiched between the fourth magnetic steel 304 and the mass block 31. The first magnetic conducting sheet 311 is aligned with and of equal length to the first magnetic steel 301, the second magnetic conducting sheet 312 is aligned with and of equal length to the second magnetic steel 302, the third magnetic conducting sheet 313 is aligned with and of equal length to the third magnetic steel 303, and the fourth magnetic conducting sheet 314 is aligned with and of equal length to the fourth magnetic steel 304.

The elastic member 4 includes an elastic arm 41 spaced apart from the mass block 31, a first connecting arm 42 bent and extended from one end of the elastic arm 41 to be fixed to the mass block 31, and a second connecting arm 43 bent and extended from the other end of the elastic arm 41 to be fixed to the casing 1.

The linear vibration motor 100 includes a first welding tab 71 welding the first connecting arm 42 to the mass block 31 by means of a welding joint and a second welding tab 72 welding the second connecting arm 43 to the upper cover body 12 by means of a welding joint.

The linear vibration motor 100 further includes a limit block 8, which is fixed to the lower cover body 11 and configured to limit the movement of the vibrator 3.

Compared with the related art, the present application provides a linear vibration motor, including a casing having an accommodating space, a stator and a vibrator accommodated in the accommodating space, and an elastic member fixed to the casing and configured to suspend the vibrator in the accommodating space. The vibrator includes a mass block fixedly connected to the elastic member and having a through-hole, and a magnetic circuit system accommodated in the through-hole. The magnetic circuit system includes a first magnetic steel arranged on one side of the stator in a direction perpendicular to the vibration direction of the vibrator and a second magnetic steel arranged on the other side of the stator in the direction perpendicular to the vibration direction of the vibrator. The first magnetic steel and the second magnetic steel are extended in parallel and arranged centrally symmetrically around a geometric center of the stator; the first magnetic steel includes a first magnetic steel portion, an orthographic projection of which along a direction perpendicular to the vibration direction of the vibrator is arranged outside the second magnetic steel; and the second magnetic steel includes a second magnetic steel portion, an orthographic projection of which along the direction perpendicular to the vibration direction of the vibrator is arranged outside the first magnetic steel. The asymmetric magnetic circuit structure in the present application can improve the nonlinear vibration when the stator is offset during the arrangement, which is helpful for improving the stability and yield of the test.

Described above are only some embodiments of the present application, and it should be noted herein that improvements may be made by those of ordinary skill in the art without departing from the inventive conception of the present application, but all of these fall within the protection scope of the present application.

What is claimed is:

1. A linear vibration motor, comprising:
    a casing with an accommodating space;
    a stator accommodated in the accommodating space;
    a vibrator accommodated in the accommodating space, comprising:
        a mass block fixedly connected to an elastic member and provided with a through-hole; and
        a magnetic circuit system accommodated in the through-hole, comprising:
            a first magnetic steel arranged on one side of the stator in a vibration direction perpendicular to the vibrator; and
            a second magnetic steel arranged on the other side of the stator in the vibration direction perpendicular to the vibrator; and
    the elastic member fixed to the casing and configured to suspend in the vibrator in the accommodating space;
    wherein the first magnetic steel and the second magnetic steel are extended in parallel and arranged centrally symmetrically around a geometric center of the stator; the first magnetic steel comprises a first magnetic steel portion, an orthographic projection of which along a direction perpendicular to the vibration direction of the vibrator is arranged outside the second magnetic steel; and the second magnetic steel comprises a second magnetic steel portion, an orthographic projection of which along the direction perpendicular to the vibration direction of the vibrator is arranged outside the first magnetic steel.

2. The linear vibration motor of claim 1, wherein the elastic member comprises an elastic arm spaced apart from the mass block, a first connecting arm bent and extended from one end of the elastic arm to be fixed to the mass block, and a second connecting arm bent and extended from the other end of the elastic arm to be fixed to the casing; and the linear vibration motor further comprises a foam sandwiched between the elastic arm and the mass block.

3. The linear vibration motor of claim 1, wherein a length of the first magnetic steel portion is equal to a length of the second magnetic steel portion.

4. The linear vibration motor of claim 3, wherein a ratio of the length of the first magnetic steel section to a length of the first magnetic steel does not exceed 1/10, and a ratio of the length of the second magnetic steel section to a length of the second magnetic steel does not exceed 1/10.

5. The linear vibration motor of claim 4, wherein the ratio of the length of the first magnetic steel section to the length of the first magnetic steel ranges between 1/25 and 1/20, and the ratio of the length of the second magnetic steel section to the length of the second magnetic steel ranges between 1/25 and 1/20.

6. The linear vibration motor of claim 5, wherein the magnetic circuit system comprises a third magnetic steel arranged on one side of the stator in the vibration direction of the vibrator and a fourth magnetic steel arranged on the other side of the stator in the vibration direction of the vibrator; wherein the third magnetic steel and the fourth magnetic steel are arranged centrally symmetrically around the geometrical center of the stator.

7. The linear vibration motor of claim 6, wherein a distance between the first magnetic steel and the stator is equal to a distance between the second magnetic steel and the stator, and a distance between the third magnetic steel and the stator is equal to a distance between the fourth magnetic steel and the stator.

8. The linear vibration motor of claim 6, wherein the magnetic circuit system comprises a first magnetic conducting sheet sandwiched between the first magnetic steel and the mass block, a second magnetic conducting sheet sandwiched between the second magnetic steel and the mass block, a third magnetic conducting sheet sandwiched between the third magnetic steel and the mass block, and a fourth magnetic conducting sheet sandwiched between the fourth magnetic steel and the mass block.

9. The linear vibration motor of claim 8, wherein the first magnetic conducting sheet is aligned with and of equal length to the first magnetic steel; the second magnetic conducting sheet is aligned with and of equal length to the second magnetic steel; the third magnetic conducting sheet is aligned with and of equal length to the third magnetic steel; and the fourth magnetic conducting sheet is aligned with and of equal length to the fourth magnetic steel.

* * * * *